United States Patent
Koo et al.

(10) Patent No.: US 10,625,490 B2
(45) Date of Patent: Apr. 21, 2020

(54) METHOD OF FABRICATING BUBBLE SHEET FOR VEHICLES

(71) Applicants: HYUNDAI MOTOR COMPANY, Seoul (KR); KIA MOTORS CORPORATION, Seoul (KR)

(72) Inventors: Hong Mo Koo, Hwaseong-si (KR); Jae Eun Chang, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 194 days.

(21) Appl. No.: 15/823,032

(22) Filed: Nov. 27, 2017

(65) Prior Publication Data

US 2019/0077113 A1    Mar. 14, 2019

(30) Foreign Application Priority Data

Sep. 11, 2017 (KR) .................. 10-2017-0116060

(51) Int. Cl.

| | |
|---|---|
| *B32B 37/16* | (2006.01) |
| *B32B 38/06* | (2006.01) |
| *B32B 5/02* | (2006.01) |
| *B32B 37/06* | (2006.01) |
| *B32B 37/12* | (2006.01) |
| *B32B 7/12* | (2006.01) |
| *B32B 37/15* | (2006.01) |
| *B32B 37/10* | (2006.01) |

(Continued)

(52) U.S. Cl.
CPC ............ *B32B 5/022* (2013.01); *B32B 7/12* (2013.01); *B32B 37/0076* (2013.01); *B32B 37/06* (2013.01); *B32B 37/10* (2013.01); *B32B 37/12* (2013.01); *B32B 37/1284* (2013.01); *B32B 37/15* (2013.01); *B32B 37/16* (2013.01); *B32B 38/06* (2013.01); *B32B 37/1207* (2013.01); *B32B 2305/20* (2013.01); *B32B 2309/02* (2013.01); *B32B 2309/04* (2013.01); *B32B 2605/00* (2013.01); *B60R 13/011* (2013.01); *Y10T 428/24562* (2015.01)

(58) Field of Classification Search
CPC .................. Y10T 428/24562; B32B 5/022
USPC ......................... 156/210, 219, 292
See application file for complete search history.

(56) References Cited

U.S. PATENT DOCUMENTS

| | | | | |
|---|---|---|---|---|
| 4,507,348 A | * | 3/1985 | Nagata ..................... | B32B 3/28 428/172 |
| 4,576,669 A | * | 3/1986 | Caputo ................. | B29D 24/00 156/145 |

(Continued)

FOREIGN PATENT DOCUMENTS

KR    10-2005-0106643 A    11/2005

OTHER PUBLICATIONS

Malacari, Talc in Automotive Applications, 8thChinese Industrial Materials Conference (2009), pp. 1-10 (Year: 2009).*

*Primary Examiner* — Scott W Dodds
(74) *Attorney, Agent, or Firm* — Morgan, Lewis & Bockius LLP

(57) ABSTRACT

A method of fabricating a bubble sheet for vehicles includes steps of: preheating a first polymer sheet; providing the first polymer sheet to a partially preheated pattern forming machine to form a pattern polymer sheet including a plurality of patterns having a prominent or depressed shape; and bonding the pattern polymer sheet and a non-woven fabric sheet.

8 Claims, 3 Drawing Sheets

(51) Int. Cl.
  *B32B 37/00* (2006.01)
  *B60R 13/01* (2006.01)

(56) References Cited

U.S. PATENT DOCUMENTS

| | | | | |
|---|---|---|---|---|
| 4,698,109 A | * | 10/1987 | Lazar | E04H 4/10 |
| | | | | 156/145 |
| 2003/0077423 A1 | * | 4/2003 | Flanigan | B32B 3/30 |
| | | | | 428/166 |
| 2006/0054531 A1 | * | 3/2006 | Lombardini | B29C 48/001 |
| | | | | 206/591 |

\* cited by examiner

METHOD OF FABRICATING BUBBLE SHEET FOR VEHICLES

CROSS-REFERENCE TO RELATED APPLICATION

This application claims the benefit of priority to Korean Patent Application No. 10-2017-0116060 filed on Sep. 11, 2017 in the Korean Intellectual Property Office, the entire content of which is incorporated herein by reference.

TECHNICAL FIELD

The present disclosure relates to a method of fabricating a bubble sheet for vehicles. More particularly, it relates to a method of fabricating a bubble sheet for vehicles having light weight and improved rigidity.

BACKGROUND

Recently, as vehicles are gradually recognized as living spaces, demand for comfortable indoor spaces is increasing and indoor air quality management regulations are being strengthened. For this purpose, interest in sheets which may be used in luggage storage spaces of vehicles is increasing. For example, the present disclosure proposes a bubble sheet for vehicles which may be used on a luggage covering mat installed to hide spare tires, tools, vehicle body panels, etc. loaded in the lower region of a trunk of a vehicle and to load luggage thereon. Conventional luggage covering mats use a wood flour reinforced board, a natural fiber reinforced board, etc., but the wood flour reinforced board and the natural fiber reinforced board generate odor when components contained therein are carbonized or oxidized. Further, a polymer sheet including a single layer may be used but the polymer sheet has low rigidity. Korean Patent Laid-open Publication No. 2005-0106643 discloses a method of fabricating an air bubble sheet but, since the air bubble sheet includes a separate filler within air bubbles, a fabricating process of the air bubble sheet is complicated and weight reduction is not achieved.

SUMMARY OF THE DISCLOSURE

The present disclosure has been made in an effort to solve the above-described problems associated with the prior art and an aspect of the present disclosure provides a bubble sheet for vehicles which has light weight and improved rigidity.

In one aspect, the present disclosure provides a method of fabricating a bubble sheet for vehicles, including preheating a first polymer sheet; providing the first polymer sheet to a partially preheated pattern forming machine to form a pattern polymer sheet including a plurality of patterns having a prominent or depressed shape; and bonding the pattern polymer sheet and a non-woven fabric sheet.

In an exemplary embodiment, the preheating of the first polymer sheet may be performed at a temperature of 180 to 260° C. for 50 to 120 seconds.

In another exemplary embodiment, the formation of the pattern polymer sheet may be performed by extrusion or injection.

In still another exemplary embodiment, the formation of the pattern polymer sheet may include preparing the pattern forming machine including a plurality of pattern parts corresponding to the patterns, preheating the pattern parts, and forming the patterns by pressing the preheated pattern parts onto the first polymer sheet, and the preheating of the pattern parts may be performed at a temperature of 120 to 180° C. for 50 to 70 seconds.

In yet another exemplary embodiment, the bonding of the pattern polymer sheet and the non-woven fabric sheet may include providing an adhesive layer onto the non-woven fabric sheet, preheating the adhesive layer, and pressing the pattern polymer sheet and the non-woven fabric sheet with the adhesive layer interposed therebetween, and the preheating of the adhesive payer may be performed at a temperature of 180 to 240° C. for 20 to 60 seconds.

In still yet another exemplary embodiment, the method may further include bonding a second polymer sheet to the pattern polymer sheet, the second polymer sheet may be spaced apart from the non-woven fabric sheet, and the second polymer sheet may be flat.

In a further exemplary embodiment, in the formation of the pattern polymer sheet, the patterns may be formed so as to have a size of 7 to 10 mm.

In another further exemplary embodiment, in the formation of the pattern polymer sheet, the patterns may be formed so as to be spaced apart from each other at a minimal interval of 2 to 3 mm.

In still another further exemplary embodiment, in the formation of the pattern polymer sheet, the patterns may be formed so that the pattern polymer sheet has a thickness of 4 to 6 mm.

Other aspects and exemplary embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIGS. 3A, 3B, 3D, 3E, 3F and 3G are cross-sectional views schematically illustrating the method;

FIG. 3C is a schematic plan view of a pattern polymer sheet in accordance with one embodiment of the present invention; and FIG. 3D is a cross-sectional view taken along line I-I' of FIG. 3C.

Figure 1:
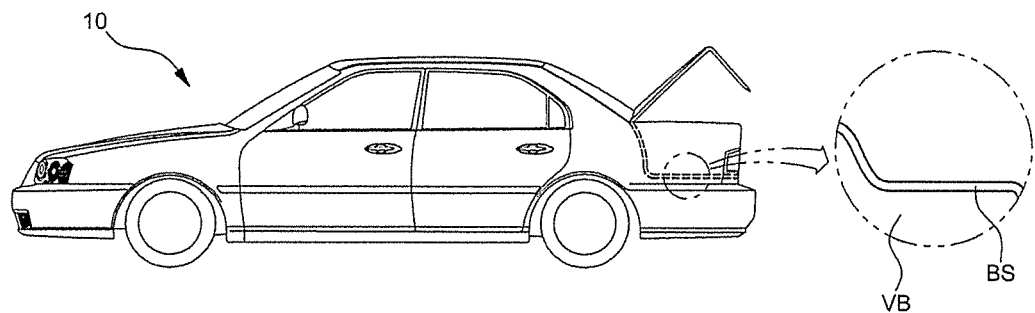
FIG. 1 is a view schematically illustrating a vehicle including a bubble sheet for vehicles in accordance with one embodiment of the present disclosure.

It should be understood that the appended drawings are not necessarily to scale, presenting a somewhat simplified representation of various preferred features illustrative of the basic principles of the present disclosure. The specific design features of the present invention as disclosed herein, including, for example, specific dimensions, orientations, locations, and shapes will be determined in part by the particular intended application and use environment.

In the figures, reference numbers refer to the same or equivalent parts throughout the several figures of the drawing.

DETAILED DESCRIPTION

Hereinafter reference will now be made in detail to various embodiments of the present disclosure, examples of which are illustrated in the accompanying drawings and described below. While the present disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the invention as defined by the appended claims.

In the drawings, the same or similar elements are denoted by the same reference numerals even though they are depicted in different drawings. In the drawings, in order to more clearly describe the present disclosure, sizes of structures are exaggerated. Further, terms "first", "second", etc. may be used to describe various elements, but the elements are not limited by the terms. These terms are used only to discriminate one element from other elements. For example, a first element may be named a second element without departing from the scope and spirit of the disclosure and, similarly, a second element may be named a first element. Singular expressions may encompass plural expressions, unless stated otherwise.

In the following description of the embodiments, terms "including" and "having" will be interpreted as indicating presence of characteristics, numbers, steps, operations, elements, parts stated in the specification or combinations thereof, and do not exclude presence of one or more other characteristics, numbers, steps, operations elements or combinations thereof, or possibility of adding them. In addition, it will be understood that, when a part, such as a layer, a film, a region or a plate, is "on" another part, the part may be located "directly on" the other part and other parts may be interposed between both parts. In the same manner, it will be understood that, when a part, such as a layer, a film, a region or a plate, is "under" another part, the part may be located "directly under" the other part and other parts may be interposed between both parts.

Hereinafter, a method of fabricating a bubble sheet for vehicles in accordance with one embodiment of the present invention will be described.

FIG. 1 is a view schematically illustrating a vehicle including a bubble sheet for vehicles, fabricated by a method of fabricating a bubble sheet for vehicles in accordance with one embodiment of the present disclosure. A vehicle 10 may imply a transportation means used to transport people, things, etc. Transportation means include overland transportation means, marine transportation means and air transportation means. Overland transportation may include, for example, automobiles including cars, vans, trucks, trailer trucks, sports cars, etc., bicycles, motorcycles, trains, etc. Marine transportation means may include, for example, ships, submarines, etc. Air transportation means may include, for example, airplanes, hang gliders, helicopters, small aerial vehicles, such as drones, etc.

A bubble sheet for vehicles BS may be used on a luggage covering mat, as described above. However, the bubble sheet for vehicles BS is not limited to the luggage covering mat and may be used in any place in which luggage may be stored. Although FIG. 1 exemplarily illustrates the bubble sheet for vehicles BS as directly contacting a vehicle body VB of the vehicle 10, the present disclosure is not limited thereto.

Figure 2:
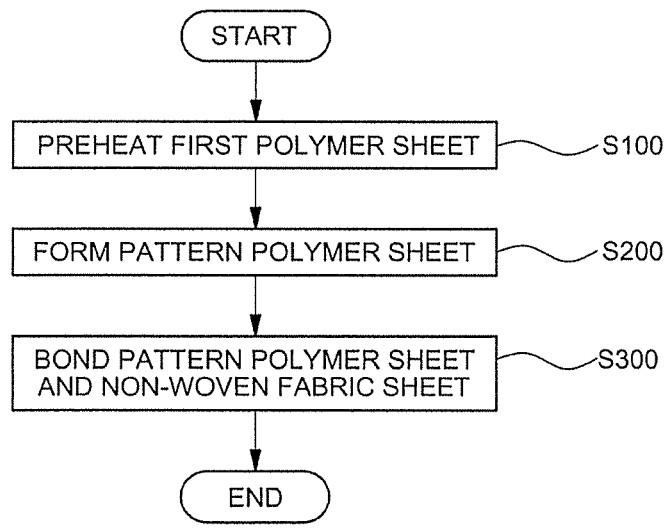
FIG. 2 is a flowchart schematically illustrating a method of fabricating a bubble sheet for vehicles in accordance with one embodiment of the present disclosure.

FIG. 2 is a flowchart schematically illustrating a method of fabricating a bubble sheet for vehicles in accordance with one embodiment of the present disclosure.

With reference to FIG. 2, a method of fabricating a bubble sheet for vehicles in accordance with one embodiment of the present disclosure includes preheating a first polymer sheet (Operation S100), forming a pattern polymer sheet provided with a plurality of patterns having a prominent or depressed shape by providing the first polymer sheet to a pattern forming machine, which is partially preheated (Operation S200), and bonding the pattern polymer sheet and a nonwoven fabric sheet (Operation S300).

Figure 3A:
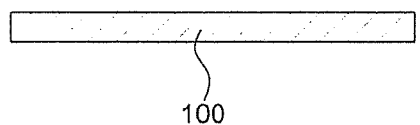
FIGS. 3A to 3G are views schematically illustrating a method of fabricating a bubble sheet for vehicles in accordance with one embodiment of the present disclosure, in more detail.
Figure 3B:
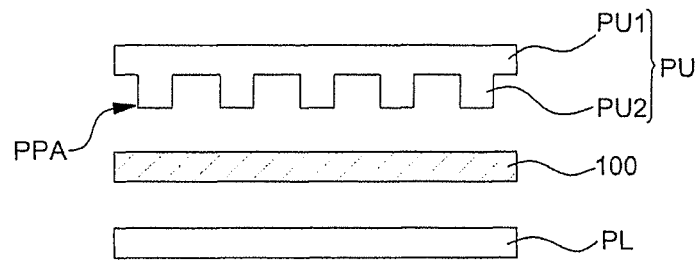
Figure 3C:
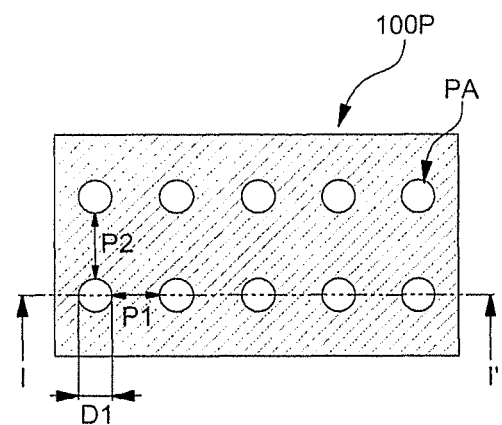
Figure 3D:
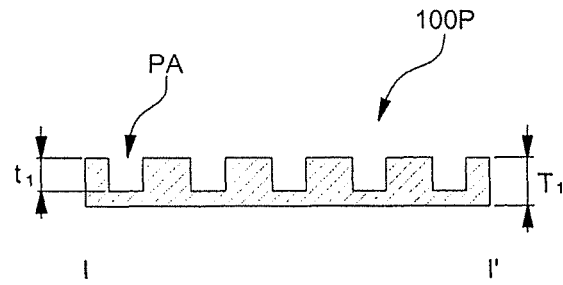

FIGS. 3A, 3B, 3D, 3E, 3F and 3G are cross-sectional views schematically illustrating the method. FIG. 3C is a schematic plan view of a pattern polymer sheet in accordance with one embodiment of the present disclosure, and FIG. 3D is a cross-sectional view taken along line I-I' of FIG. 3C.

With reference to FIGS. 2 and 3A, a first polymer sheet 100 is prepared. The first polymer sheet 100 may include, for example, polypropylene. Then, the first polymer sheet 100 is preheated (Operation S100). Preheating of the first polymer sheet 100 (Operation S100) may be performed in, for example, a preheating press or a preheating oven. Preheating of the first polymer sheet 100 (Operation S100) may be performed at a temperature of 180 to 260° C. for 50 to 120 seconds. If preheating of the first polymer sheet 100 (Operation S100) is performed below the above range, the first polymer sheet 10 is not sufficiently preheated and thus it may be difficult to form a pattern polymer sheet 100P (in FIG. 3C) and, if preheating of the first polymer sheet 100 (Operation S100) is performed over the above range, at least a part of the first polymer sheet 100 may be liquefied.

With reference to FIGS. 2 and 3B, the pattern polymer sheet 100P (in FIG. 3C) is formed by providing the first polymer sheet 100 to a pattern forming machine which is partially preheated (Operation S200). The pattern forming machine includes an upper pattern forming unit PU and a lower pattern forming unit PL. The upper pattern forming unit PU includes a flat part PU1 and a pattern forming part PU2 connected to the flat part PU1. The flat part PU1 and the pattern forming part PU2 are formed integrally. The first polymer sheet 100 is provided to a space between the upper pattern forming unit PU and the lower pattern forming unit PL. The pattern polymer sheet 100P (in FIG. 3C) may be formed by applying pressure to at least one of the upper pattern forming unit PU and the lower pattern forming unit PL.

The lower pattern forming unit PL may be flat. Although the lower pattern forming unit PL may have a platy shape, the lower pattern forming unit PL is not limited thereto and may have a rolled shape.

The pattern forming part PU2 includes a plurality of pattern parts PPA. The pattern parts PPA may protrude from the flat part PU1 in a direction toward the lower pattern forming part PL. The pattern parts PPA may respectively correspond to patterns PA (in FIG. 3D). Although not shown in the drawings, at least a part of the pattern forming part PU2 may be connected to a heating wire.

Preheating of the pattern parts PPA may be performed at a temperature of 120 to 180° C. for 50 to 70 seconds. If preheating of the pattern parts PPA is performed below the above range, it may be difficult to form the patterns PA on the first polymer sheet 100 and, if preheating of the pattern parts PPA is performed over the above range, the first polymer sheet 100 contacting the pattern parts PPA may be defective and thus durability of the first polymer sheet 100 may be lowered.

With reference to FIGS. 2, 3C and 3D, the pattern polymer sheet 100P is provided with a plurality of patterns PA. The upper surface of the pattern polymer sheet 100P may have unevenness, and the lower surface of the pattern polymer sheet 100P may be flat.

Each of the patterns PA may have a prominent or depressed shape. The depth t1 of each of the patterns PA may be less than the thickness T1 of the polymer sheet 100P. Each of the patterns PA may be a recess having an open upper surface and a closed lower surface. Each of the patterns PA may not be a through hole having open upper and lower surfaces.

Each of the patterns PA may have a circular cross-section. However, the present invention is not limited thereto and each of the patterns PA may be a polygonal cross-section, such as an oval, triangular or rectangular cross-section.

In formation of the pattern polymer sheet 100P (Operation S200), the patterns PA may be formed so as to have a size D1 of 7 to 10 mm. The size D1 of the patterns PA may mean a diameter of the patterns PA if the patterns PA have a circular cross-section, a major diameter of the patterns PA if the patterns PA have an oval cross-section, or a length of any one side of the patterns PA if the patterns PA have a polygonal cross-section. If the size D1 of the patterns PA is less than 7 mm, the patterns PA are small and thus improvement in rigidity of the bubble sheet BS (in FIG. 1) may be insufficient and, if the size D1 of the patterns PA exceeds 10 mm, intervals between the patterns PA are great and durability of the pattern polymer sheet 100P may be lowered.

In formation of the pattern polymer sheet 100P (Operation S200), the patterns PA may be formed so as to have minimal intervals P1 and P2 of 2 to 3 mm. Although FIG. 3C illustrates the patterns PA as being spaced apart from each other at the same interval in row and column directions, the present invention is not limited thereto and the patterns PA may be spaced randomly in the row and column directions. The minimal interval PA between the patterns PA may mean a minimal interval P1 between the patterns PA in the row direction or a minimal interval P2 between the patterns PA in the column direction. If the minimal interval between the patterns PA is less than 2 mm, the number of the patterns PA is large and durability of the pattern polymer sheet 100P may be lowered. Further, if the minimal interval between the patterns PA exceeds 3 mm, the number of the patterns PA is small and improvement in rigidity of the bubble sheet BS (in FIG. 1) may be insufficient.

In formation of the pattern polymer sheet 100P (Operation S200), the patterns PA may be formed so that the pattern polymer sheet 100P has a thickness T1 of 4 to 6 mm. If the thickness T1 of the pattern polymer sheet 100P is less than 4 mm, the pattern polymer sheet 100P may have low resistance to external impact due to its small thickness T1 and, if the thickness T1 of the pattern polymer sheet 100P exceeds 6 mm, the pattern polymer sheet 100P may have low flexibility due to its great thickness.

Formation of the pattern polymer sheet 100P (Operation S200) may be performed by extrusion or injection. Formation of the pattern polymer sheet 100P (Operation S200) includes preparing the pattern forming machine including the pattern parts PPA corresponding to the patterns PA, preheating the pattern parts PPA, and forming the patterns PA by pressing the preheated pattern parts PPA onto the first polymer sheet 100.

Figure 3E:
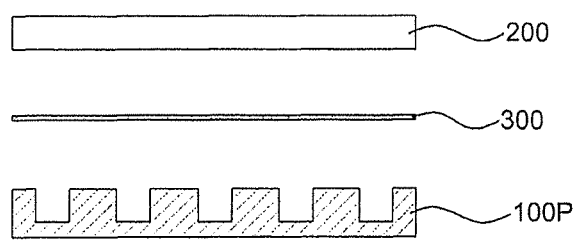
Figure 3F:
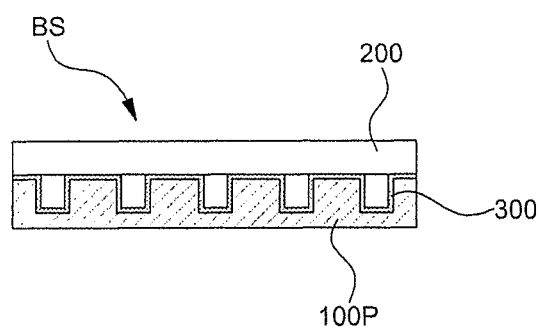

With reference to FIGS. 2, 3E and 3F, bonding of the pattern polymer sheet 100P and a non-woven fabric sheet 200 (Operation S300) includes providing an adhesive layer 300 onto the non-woven fabric sheet 200, preheating the adhesive layer 300, and pressing the pattern polymer sheet 100P and the non-woven fabric sheet 200 with the adhesive layer 300 interposed therebetween. The adhesive layer 300 may be, for example, a hot melt adhesive layer. The non-woven fabric sheet 200 may have a similar shape to the pattern polymer sheet 100P and the same size as the pattern polymer sheet 100P. However, the present disclosure is not limited thereto, and the non-woven fabric sheet 200 may have a greater size than the pattern polymer sheet 100P and then be cut along the outline of the pattern polymer sheet 100P so as to have the same size as the pattern polymer sheet 100P after bonding between the pattern polymer sheet 100P and the non-woven fabric sheet 200.

Preheating of the adhesive layer 300 may be performed in, for example, a preheating press or a preheating oven. Preheating of the adhesive layer 300 may be performed at a temperature of 180 to 240° C. for 20 to 60 seconds. If preheating of the adhesive layer 300 is performed below the above range, the adhesive layer 300 may not be sufficiently melted and, if preheating of the adhesive layer 300 is performed over the above range, the adhesive layer 300 may be liquefied.

Figure 3G:
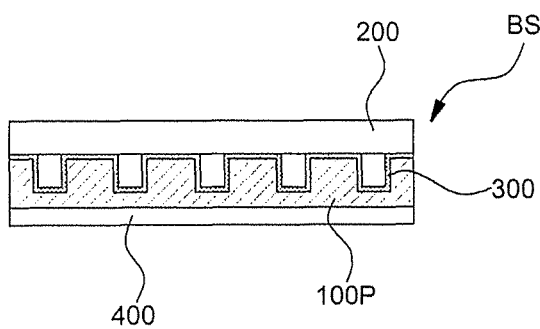

With reference to FIG. 3G, the method of fabricating the bubble sheet BS for vehicles in accordance with one embodiment of the present invention further includes bonding a second polymer sheet 400 to the pattern polymer sheet 100P. The second polymer sheet 400 is spaced apart from the non-woven fabric sheet 200. The second polymer sheet 400 is provided to the lower surface of the pattern polymer sheet 100P. The second polymer sheet 400 may be flat. The upper and lower surfaces of the second polymer sheet 400 may be flat. The second polymer sheet 400 may include, for example, polypropylene.

Although not shown in the drawings, the method of fabricating the bubble sheet BS for vehicles in accordance with one embodiment of the present invention further includes preheating the pattern polymer sheet 100P to a temperature of 50 to 80° C., and pressing the edge of the pattern polymer sheet 100P and the edge of the non-woven fabric sheet 200 using a press preheated to a temperature of 160 to 200° C. Thereby, the forming state of the edge of the bubble sheet BS may be improved, and production costs of the non-woven fabric sheet 200 may be reduced, as compared to a method in which the non-woven fabric sheet 200 surrounds the edge of the pattern polymer sheet 100P by sewing.

Further, in accordance with another embodiment of the present disclosure, in bonding between the pattern polymer sheet 100P and the non-woven fabric sheet 200 (Operation S300), the adhesive layer 300 is not provided and the pattern polymer sheet 100P and the non-woven fabric sheet 200 may be bonded using remaining latent heat after manufacture of the non-woven fabric sheet 200.

In more detail, the non-woven fabric sheet 200 is manufactured by extrusion through a T-die. The non-woven fabric sheet 200 may be placed on one surface or both surfaces of the pattern polymer sheet 100P, under the condition that heat transmitted during the manufacturing process of the non-woven fabric sheet 200 remains, and be then bonded to the pattern polymer sheet 100P by pressing, thus fabricating the bubble sheet BS for vehicles.

The bubble sheet BS for vehicles fabricated by the method in accordance with one embodiment of the present invention may include the pattern polymer sheet 100P and thus have light weight and improved rigidity. Further, the patterns PA are formed on the first polymer sheet 100 only through one operation and, thus, the fabricating process of the bubble sheet for vehicles BS may be simplified.

Hereinafter, the present disclosure will be described in detail through the following test examples. It will be understood that the test examples are made only to more easily describe the present disclosure and are not intended to limit the scope and sprit of the disclosure.

Test Example 1

A first polymer sheet containing 90 wt. % of polypropylene and 10 wt. % of talc was manufactured. In the present invention, the first polymer sheet is preferably manufactured to contain 80 wt. % to 90 wt. % of polypropylene and 10 wt. % to 20 wt. % of talc. If the talc content is 10 wt. % to 20 wt. %, dimensional stability is improved and thus formation of parts may be facilitated. However, if the talc content exceeds 20 wt. %, the weight of the first polymer sheet is increased and thus weight reduction of a bubble sheet for vehicles may be unfavorable. Most preferably, the first polymer sheet may be manufactured to contain 85 wt. % of polypropylene and 15 wt. % of talc.

The first polymer sheet was preheated at a temperature of 180 to 260° C. for 50 to 120 seconds. A pattern polymer sheet having a thickness of 4 to 6 mm and provided with patterns having a diameter of 7 to 10 mm and spaced apart from each other at an interval of 2 to 3 mm was manufactured by placing the first polymer sheet on a roller and extruding the first polymer sheet using pattern parts preheated at a temperature of 120 to 180° C. for 50 to 70 seconds. A non-woven fabric sheet was bonded to the pattern polymer sheet using an adhesive layer interposed therebetween by pressing, thus fabricating a bubble sheet for vehicles.

Test Example 2

A second polymer sheet which is flat was bonded to a pattern polymer sheet by pressing. The pattern polymer sheet provided with the second polymer sheet was preheated to a temperature of 50 to 80° C., and the edge of the pattern polymer sheet and the edge of a non-woven fabric sheet are pressed by a press preheated to a temperature of 160 to 200° C., thus fabricating a bubble sheet for vehicles.

Comparative Example 1

A wood flour reinforced board including a single layer containing 40 wt. % of wood flour and 60 wt. % of polypropylene fiber was manufactured.

Comparative Example 2

A natural fiber reinforced board including a single layer containing 50 wt. % of natural fiber and 60 wt. % of polypropylene fiber was manufactured.

Comparative Example 3

A flat polymer sheet containing polypropylene alone was manufactured.

Comparative Example 4

A polymer sheet having a honeycomb structure containing polypropylene alone and including a plurality of pattern holes was manufactured. The polymer sheet includes a single layer.

Comparative Example 5

A polymer sheet containing polypropylene alone and including a plurality of pattern recesses was manufactured. The polymer sheet includes a single layer.

TABLE 1

| Categorization | Comparative example 1 | Comparative example 2 | | | Comparative example 3 | Test example 1 | Test example 2 | | |
| --- | --- | --- | --- | --- | --- | --- | --- | --- | --- |
| Weight (kg/m$^2$) | 2.9 | 2.0 | 2.2 | 2.4 | 1.8 | 1.8 | 1.8 | 2.0 | 2.2 |
| Maximum load (N/50 mm) | 105 | 120 | 136 | 156 | 85 | 129 | 136 | 173 | 192 |

With reference to Table 1, it may be confirmed that the bubble sheets for vehicles of Test examples 1 and 2 are lighter weight than the sheets of Comparative examples 1 to 3 but withstand higher load. Therefore, it may be confirmed that, if the same weight is used, the bubble sheets for vehicles of Test examples 1 and 2 have higher maximum loads than the sheets of Comparative examples 1 to 3.

As is apparent from the above description, in a method of fabricating a bubble sheet for vehicles in accordance with one embodiment of the present invention, the bubble sheet for vehicles may have light weight and improved rigidity.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of fabricating a bubble sheet for vehicles, comprising steps of:
   preheating a first polymer sheet;
   providing the first polymer sheet to a partially preheated pattern forming machine to form a pattern polymer sheet including a plurality of patterns having a prominent or depressed shape; and
   bonding the pattern polymer sheet and a non-woven fabric sheet such that a surface having the plurality of patterns is in contact with the non-woven fabric sheet,
   wherein the first polymer sheet comprises 80 wt. % to 90 wt. % of polypropylene and 10 wt. % to 20 wt. % of talc.

2. The method of claim 1, wherein the step of preheating the first polymer sheet is performed at a temperature of 180 to 260° C. for 50 to 120 seconds.

3. The method of claim 1, wherein the step of providing the first polymer sheet to the partially preheated pattern forming machine to form the pattern polymer sheet includes steps of:

preparing the pattern forming machine including a plurality of pattern parts corresponding to the patterns;
preheating the pattern parts; and
forming the patterns by pressing the preheated pattern parts onto the first polymer sheet,
wherein the step of preheating the pattern parts is performed at a temperature of 120 to 180° C. for 50 to 70 seconds.

4. The method of claim 1, wherein the step of bonding the pattern polymer sheet and the non-woven fabric sheet includes steps of:
providing an adhesive layer onto the non-woven fabric sheet; preheating the adhesive layer; and pressing the pattern polymer sheet and the non-woven fabric sheet with the adhesive layer interposed therebetween,
wherein the step of preheating the adhesive layer is performed at a temperature of 180 to 240° C. for 20 to 60 seconds.

5. The method of claim 1, further comprising a step of: bonding a second polymer sheet to the pattern polymer sheet, wherein: the second polymer sheet is spaced apart from the non-woven fabric sheet; and the second polymer sheet is flat.

6. The method of claim 1, wherein, in the formation of the pattern polymer sheet, the patterns are formed so as to have a size of 7 to 10 mm.

7. The method of claim 1, wherein, in the formation of the pattern polymer sheet, the patterns are formed so as to be spaced apart from each other at a minimal interval of 2 to 3 mm.

8. The method of claim 1, wherein, in the formation of the pattern polymer sheet, the patterns are formed so that the pattern polymer sheet has a thickness of 4 to 6 mm.

* * * * *